(12) United States Patent
Sekhri et al.

(10) Patent No.: US 10,404,540 B2
(45) Date of Patent: Sep. 3, 2019

(54) G.8032 MISCONFIGURATION DETECTION SYSTEMS AND METHODS

(71) Applicant: Ciena Corporation, Hanover, MD (US)

(72) Inventors: Rahul Sekhri, Ambala (IN); Pankaj Verma, Kanpur (IN)

(73) Assignee: Ciena Corporation, Hanover, MD (US)

( * ) Notice: Subject to any disclaimer, the term of this patent is extended or adjusted under 35 U.S.C. 154(b) by 220 days.

(21) Appl. No.: 15/452,776

(22) Filed: Mar. 8, 2017

(65) Prior Publication Data

US 2018/0212828 A1  Jul. 26, 2018

(30) Foreign Application Priority Data

Jan. 24, 2017  (IN) .............................. 201711002652

(51) Int. Cl.
*G06F 15/177* (2006.01)
*H04L 12/24* (2006.01)
*H04L 12/46* (2006.01)
*H04L 12/437* (2006.01)

(52) U.S. Cl.
CPC ........ *H04L 41/0873* (2013.01); *H04L 12/437* (2013.01); *H04L 12/4641* (2013.01)

(58) Field of Classification Search
CPC ............... H04L 41/0873; H04L 12/437; H04L 12/4641
USPC ........................................................ 709/220
See application file for complete search history.

(56) References Cited

U.S. PATENT DOCUMENTS

| 2011/0142062 | A1* | 6/2011 | Wang ..................... H04L 12/66 370/401 |
| 2014/0355447 | A1* | 12/2014 | Gohite ................. H04W 40/34 370/236 |
| 2016/0191302 | A1* | 6/2016 | Tsubota .................... H04B 3/36 370/222 |
| 2017/0339028 | A1* | 11/2017 | Holness ............. H04L 41/5025 |
| 2018/0076976 | A1* | 3/2018 | Chhabra ............... H04L 12/437 |
| 2018/0097658 | A1* | 4/2018 | Palchaudhuri ...... H04L 41/0873 |
| 2018/0102944 | A1* | 4/2018 | Mishra .................... H04L 45/66 |

OTHER PUBLICATIONS

ITU-T, Telecommunication Standardization Sector of ITU, G.8013/Y.1731, Operation, administration and maintenance (OAM) functions and mechanisms for Ethernet-based networks, Aug. 2015, pp. 1-102.

(Continued)

*Primary Examiner* — Frantz B Jean
(74) *Attorney, Agent, or Firm* — Clements Bernard Walker PLLC; Christopher L. Bernard; Lawrence A. Baratta, Jr.

(57) ABSTRACT

A G.8032 misconfiguration detection method in a node includes receiving a mapped configuration from another node on a ring, wherein the mapped configuration includes a mapping of G.8032 instances to Virtual Local Area Network (VLAN) identifiers configured at the another node; comparing the mapped configuration with a local configuration on the node; and, responsive to a mismatch in the comparing, providing one of a trap and a notification based on the mismatch. The G.8032 misconfiguration can include one of a VLAN not mapped as protected to a node and a VLAN removed from a protected list at the node.

20 Claims, 8 Drawing Sheets

(56) References Cited

OTHER PUBLICATIONS

ITU-T, Telecommunication Standardization Sector of ITU, G.8032/Y.1344, Ethernet ring protection switching, Jun. 2008, pp. 1-46.
ITU-T, Telecommunication Standardization Sector of ITU, G.8032/Y.1344, Ethernet ring protection switching, Feb. 2012, pp. 1-104.
ITU-T, Telecommunication Standardization Sector of ITU, G.8032/Y.1344, Ethernet ring protection switching, Aug. 2015, pp. 1-82.

* cited by examiner

G.8032 MISCONFIGURATION DETECTION SYSTEMS AND METHODS

FIELD OF THE DISCLOSURE

The present disclosure generally relates to networking systems and methods. More particularly, the present disclosure relates to Ethernet Ring Protection Switching, i.e., ITU-T G.8032, misconfiguration detection systems and methods.

BACKGROUND OF THE DISCLOSURE

The Ethernet Ring Protection Switching (ERPS) protocol is an industry standard and is specified within International Telecommunication Union ITU SG15 Q9, under G.8032 "Ethernet ring protection switching" (G.8032v1—2008, G.8032v2—2010, G.8032v3—2012, and G.8032v4—2015), the contents of which are incorporated by reference. ERPS specifies protection switching mechanisms and a protocol for Ethernet layer network (ETH) rings. Each Ethernet Ring Node is connected to adjacent Ethernet Ring Nodes participating in the same Ethernet Ring, using two independent links. A ring link is bounded by two adjacent Ethernet Ring Nodes, and a port for a ring link is called a ring port. The minimum number of Ethernet Ring Nodes in an Ethernet Ring is two. Two fundamental principles of G.8032 include a) loop avoidance and b) utilization of learning, forwarding, and Filtering Database (FDB) mechanisms defined in the Ethernet flow forwarding function (ETH_FF). Loop avoidance in an Ethernet Ring is achieved by guaranteeing that, at any time, traffic may flow on all but one of the ring links. This particular link is called the Ring Protection Link (RPL), and under normal conditions, this ring link is blocked, i.e. not used for service traffic. One designated Ethernet Ring Node, the RPL Owner Node, is responsible for blocking traffic at one end of the RPL. Under an Ethernet ring failure condition, the RPL Owner Node is responsible for unblocking its end of the RPL (unless the RPL has failed) allowing the RPL to be used for traffic. The other Ethernet Ring Node adjacent to the RPL, the RPL Neighbor Node, may also participate in blocking or unblocking its end of the RPL. The event of an Ethernet Ring failure results in protection switching of the traffic. This is achieved under the control of the ETH_FF functions on all Ethernet Ring Nodes. An Automatic Protection Switching (APS) protocol is used to coordinate the protection actions over the ring.

G.8032v2 introduced additional features, such as: multi-ring/ladder network support; revertive/non-revertive mode after condition, that is causing the switch, is cleared; administrative commands: Forced Switch (FS), Manual Switch (MS) for blocking a particular ring port; flush FDB (Filtering database) logic, which significantly reduces amount of flush FDB operations in the ring; and support of multiple ERP instances on a single ring.

G.8032 deployments have proliferated as it supports a simplified network architecture and enables fast protection switching. In actual deployments, there can be hundreds to thousands of Virtual Local Area Networks (VLANs) on a given G.8032 ring. With a large number of VLANs on a given ring, there can easily be misconfigurations such as missing a VLAN at a particular node, removing a VLAN from a node, etc. That is, the configuration of VLANs and G.8032 rings can include operator configuration leading to human errors. Unfortunately, there are no efficient misconfiguration detection techniques to notify the network operator prior to issues, e.g., broadcast storms, etc. Specifically, the misconfigurations may not exhibit problems under normal working conditions, but cause loops when there is a link failure and recovery. With hundreds or thousands of VLANs possible per node per G.8032 rings, there is a need for efficient G.8032 misconfiguration detection systems and methods.

BRIEF SUMMARY OF THE DISCLOSURE

In an exemplary embodiment, a G.8032 misconfiguration detection method in a node includes receiving a mapped configuration from another node on a G.8032 ring, wherein the mapped configuration includes a mapping of Virtual Local Area Network (VLAN) identifiers to G.8032 instances configured at the another node; comparing the mapped configuration with a local configuration on the node; and, responsive to a mismatch in the comparing, providing one of a trap and a notification based on the mismatch. The G.8032 misconfiguration detection method can further include, responsive to the mismatch, implementing a detection timer and providing one of the trap and the notification only if the mismatch is present subsequent to expiration of the detection time. The mapped configuration can be received in a Ring Automated Protection Switching (R-APS) Protocol Data Unit (PDU). The mapped configuration can be received in a Ring Automated Protection Switching (R-APS) Protocol Data Unit (PDU), as an Organizationally Specific Type, Length, and Value (TLV).

The mapped configuration can be provided as a configuration digest including a representation of the VLAN identifiers to G.8032 instances in an N byte format. The mapped configuration can be provided as a configuration digest including a representation of the VLAN identifiers to G.8032 instances in an N byte format, and wherein the comparing can include a function to compare the representation from the received mapped configuration to the representation of the local configuration. The G.8032 rings can have at least 100 VLANs configured thereon. The G.8032 misconfiguration can include one of a VLAN not mapped as protected to a node and a VLAN removed from a protected list at the node.

In another exemplary embodiment, a node adapted to perform G.8032 misconfiguration detection includes one or more ports; and a controller configured to obtain a mapped configuration from another node on a G.8032 ring, wherein the mapped configuration includes a mapping of G.8032 instances to Virtual Local Area Network (VLAN) identifiers configured at the another node, compare the mapped configuration with a local configuration on the node, and raise one of a trap and a notification based on detection of a mismatch. The controller can be further configured to, responsive to the mismatch, implement a detection timer and provide one of the trap and the notification only if the mismatch is present subsequent to expiration of the detection time. The mapped configuration can be received in a Ring Automated Protection Switching (R-APS) Protocol Data Unit (PDU). The mapped configuration can be provided as a configuration digest including a representation of the VLAN identifiers to G.8032 instances in an N byte format. The G.8032 rings can have at least 100 VLANs configured thereon. The G.8032 misconfiguration can include one of a VLAN not mapped as protected to a node and a VLAN removed from a protected list at the node.

In a further exemplary embodiment, a G.8032 misconfiguration detection apparatus includes circuitry configured to receive a mapped configuration from another node on a G.8032 ring, wherein the mapped configuration includes a mapping of G.8032 instances to Virtual Local Area Network (VLAN) identifiers configured at the another node; circuitry configured to compare the mapped configuration with a local configuration on the node; and circuitry configured to provide one of a trap and a notification based on detection of a mismatch. The G.8032 misconfiguration detection apparatus can further include circuitry configured to implement a detection timer responsive to the mismatch and provide one of the trap and the notification only if the mismatch is present subsequent to expiration of the detection time. The mapped configuration can be received in a Ring Automated Protection Switching (R-APS) Protocol Data Unit (PDU). The mapped configuration can be provided as a configuration digest including a representation of the VLAN identifiers to G.8032 instances in an N byte format. The G.8032 rings can have at least 100 VLANs configured thereon. The G.8032 misconfiguration can include one of a VLAN not mapped as protected to a node and a VLAN removed from a protected list at the node.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to Ethernet Ring Protection Switching, i.e., ITU-T G.8032, misconfiguration detection systems and methods. The G.8032 misconfiguration detection systems and methods automate the misconfiguration detection through nodal communications and checking. This approach eliminates the need for manually logging into each node of a G.8032 ring to identify a misconfigured VLAN and node. Again, misconfigurations may not be apparent until there is a failure and/or recovery and the result may be a broadcast storm. In most deployments, a remote management connection is used to log into nodes, and if there is a broadcast storm, the remote management connection may be lost causing a need for local site visits. The G.8032 misconfiguration detection systems and methods can identify misconfigurations in advance prior to any broadcast storms, enabling corrective action and avoiding traffic loss or network problems.

Example G.8032 Ring and Operation

Figure 1:
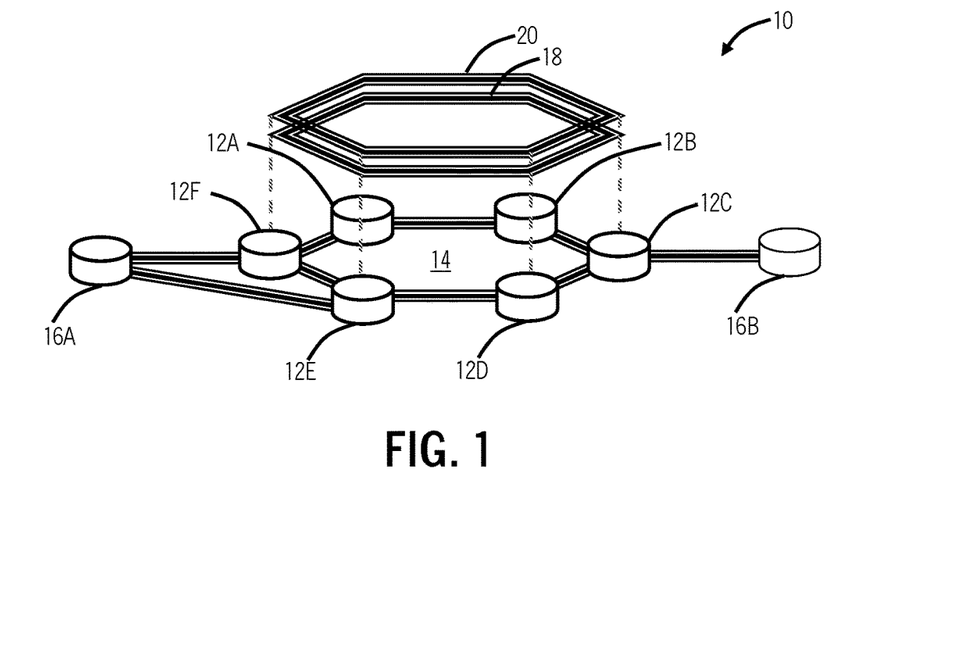
FIG. 1 is a network diagram of a network of network elements in a ring providing G.8032, Ethernet Ring Protection.

Referring to FIG. 1, in an exemplary embodiment, a network diagram illustrates a network 10 of network elements 12A-12F (collectively referred to herein as network elements 12) in a ring 14 providing G.8032, Ethernet Ring Protection. Also, the network 10 may include network elements 16A, 16B interconnected via the ring 14. The network elements 12, 16A, 16B may include optical switches, optical cross-connects, SONET/SDH devices with layer two traffic, Optical Transport Network (OTN) switches with layer two traffic, Ethernet switches, routers, or any other device commonly known how to forward data packets in a network. The network elements 12 are physically configured in a ring topology and the ring 14 is a logical construct that forms a closed loop over the physical network infrastructure. The network elements 12 may utilize G.8032 Ethernet Ring Protection Switching over the ring 14 to provide rapid protection switching below 50 ms. Advantageously using G.8032, the ring 14 and the network elements 12 may be client and server layer agnostic while using existing (and commodity) IEEE 802.1 (bridging) and IEEE 802.3 (MAC) hardware. Connections between adjacent network elements 12 in the ring 14 (i.e., the ring spans) are assumed to be bi-directional, and may be a link, a link aggregation group, or a subnet (e.g., Multiprotocol Label Switching (MPLS), Provider Backbone Bridge Traffic Engineering (PBB-TE), SONET/SDH, OTN, etc.). Also, the ring spans associated with the ring 14 need not be the same bandwidth nor server layer technology. In Ethernet Ring Protection Switching, a "virtual ring" (VRing) is associated with the ring 14 and each VRing includes two channels 18, 20—a Ring Automated Protection Switching (R-APS) channel 18 used for transport of ring control Protocol Data Units (PDUs) and a service data channel 20 used for transport of client data traffic.

Figure 2:
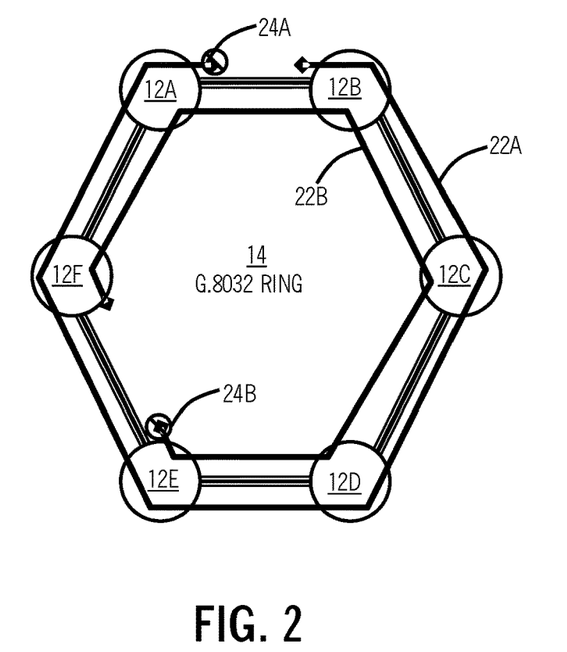
FIG. 2 is a network diagram of the ring of FIG. 1 with two Virtual Rings provisioned thereon.

Referring to FIG. 2, in an exemplary embodiment, a network diagram illustrates the ring 14 with two VRings 22A, 22B provisioned thereon. Each of the VRings 22A, 22B has a service data channel 20 providing client traffic flows over the ring 14 that share a commonly provisioned channel block. Also, each client micro traffic flow may have a Virtual Local Area Network (VLAN) associated with it. Also, the multiple VRings 22A, 22B on a given Ring cannot have an overlapping VLAN Identification (VID) space. Each of the VRings 22A, 22B also includes a channel block 24A, 24B (collectively referred to herein as a channel block 24) that prevents VLAN tagged traffic from being relayed/forwarded between [ring or client] ports. Thus, each of the VRings 22A, 22B includes an R-APS channel 18 and a service data channel 20. Each channel 18, 20 needs at least a single channel blocking point on the ring 14, i.e. the channel block 24A, 24B. Using Ethernet Ring Protection, there is a central node called the Ring Protection Link (RPL) owner node which blocks, using the channel block 24, one of the ports, known as the RPL port, to ensure that no loop forms for the Ethernet traffic. R-APS messages are used to coordinate the activities of switching the RPL link on or off. Ethernet Shared Protection Ring (E-SPRing) is one instantiation, i.e. one embodiment, of the ERP standard.

Figure 3:
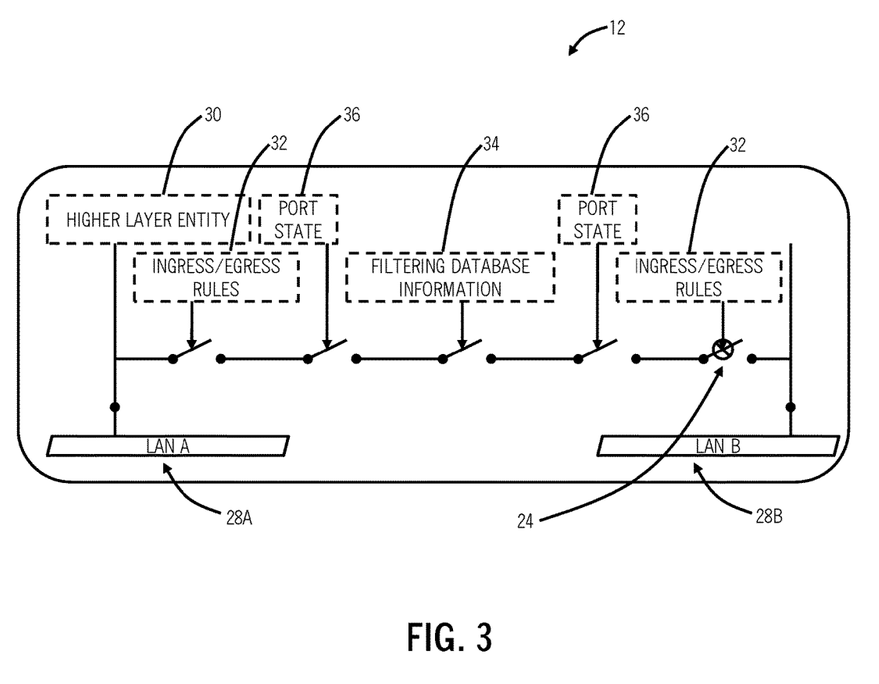
FIG. 3 is a functional block diagram of an exemplary channel block in a network element.

Referring to FIG. 3, in an exemplary embodiment, a functional block diagram illustrates an exemplary channel block 24 in the network element 12. The network element 12 is illustrated with two exemplary ports 28A, 28B (referred to a LAN A and LAN B). The network element 12 may include higher level entities 30, ingress/egress rules 32, port state 34, and a filtering database information 36. The channel block 24 function prevents traffic from being forwarded by the receive ring port. However, it does not prevent traffic from being received by the higher-level entities 30 (e.g., G.8032 Engine) on the network element 12. In an exemplary embodiment, the channel block 24 may be realized by ingress/egress rules 34 placed on a [virtual] ring port 28. The following Channel block rules should be applied such that each of the channels 18, 20 must have at least a [single] channel block 24 installed (at all times) and the location of the "provisioned" channel block 24 (associated with the Ring Protection Link) is [currently] operator determined.

G.8032 Ethernet Ring Protection

Figure 4:
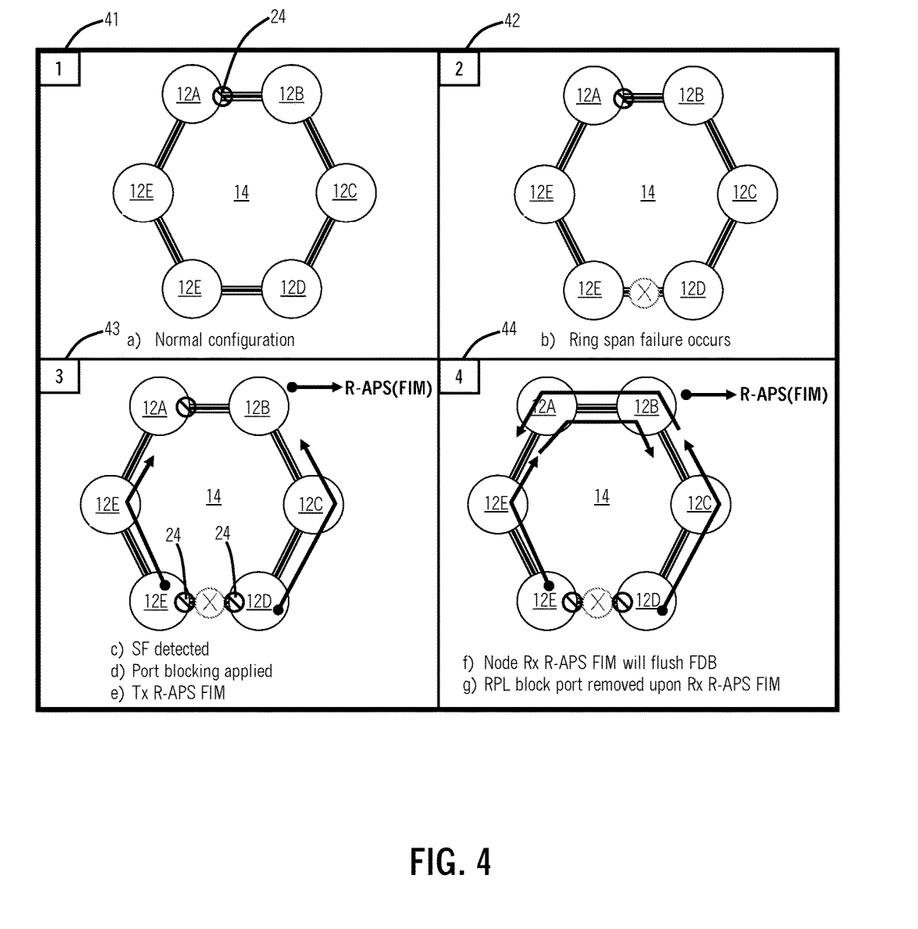
FIG. 4 is a sequence of network diagrams of the ring of FIG. 1 illustrating a failure sequence using G.8032 Ethernet Ring Protection on the network elements.

Referring to FIG. 4, in an exemplary embodiment, a sequence of network diagrams of the ring 14 illustrates a failure sequence using G.8032 Ethernet Ring Protection on the network elements 12. At a first point 41 in FIG. 4, the ring 14 is operating in a normal configuration, i.e. no failures. In this example, the channel block 24 is at the network element 12A facing the network element 12B. At a point 42, a failure occurs on a ring span between the network elements 12E, 12D. At a point 43, a signal failure (SF) is detected on the ring, port blocking is applied to the network elements 12E, 12D via channel blocks 24, and R-APS Failure Indication Messages (FIM) are transmitted. At a point 44, each of the network elements 12 will receive the R-APS FIM and flush their current Forwarding Database (FDB) and the channel block 24 will be removed at the network element 12A upon receipt of the R-APS FIM. The FDB includes information which contains the routing configuration from the point of view of the current network element. Under G.8032, general protocol guidelines used to support protection switching within 50 ms are 1) Time for a R-APS message to circulate an entire ring (i.e., ring circumference and nodal transit delays) should be ≤10 ms, 2) Time taken to install channel blocks should be ≤15 ms, 3) Time taken to cleanse stale entries found in the FDB associated with Ring should be ≤10 ms, and 4) Time taken to remove channel blocks should be ≤15 ms.

Figure 5:
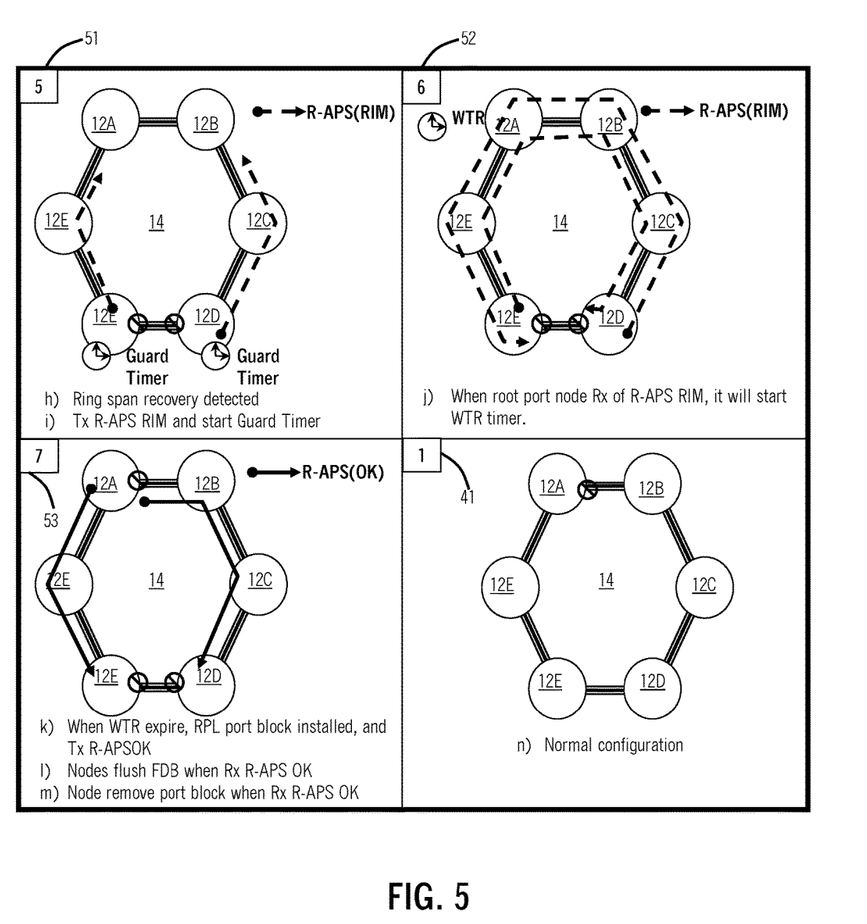
FIG. 5 is another sequence of network diagrams of the ring of FIG. 1 illustrating a recovery sequence using G.8032 Ethernet Ring Protection on the network elements.

Referring to FIG. 5, in an exemplary embodiment, another sequence of network diagrams of the ring 14 illustrates a recovery sequence using G.8032 Ethernet Ring Protection on the network elements 12. The recovery sequence includes a recovery from the failure illustrated in FIG. 4 between the network elements 12D, 12E. At a point 51, a ring span recovery is detected between the network elements 12D, 12E and R-APS Recovery Indication Messages (RIM) are transmitted along with guard timers started at the network elements 12D, 12E. At a point 52, when a root port node receives the R-APS RIM, a wait-to-restore (WTR) timer is started. At a point 53, when the WTR expires, the RPL port block is installed at the network element 12A and R-APS OK messages are transmitted. Also, each of the network elements 12 flush their FDB when the R-APS OK messages are received as well as removing port block such as at the network elements 12D, 12E when the R-APS OK messages are received.

G.8032 Misconfiguration

Figures 6, 7:
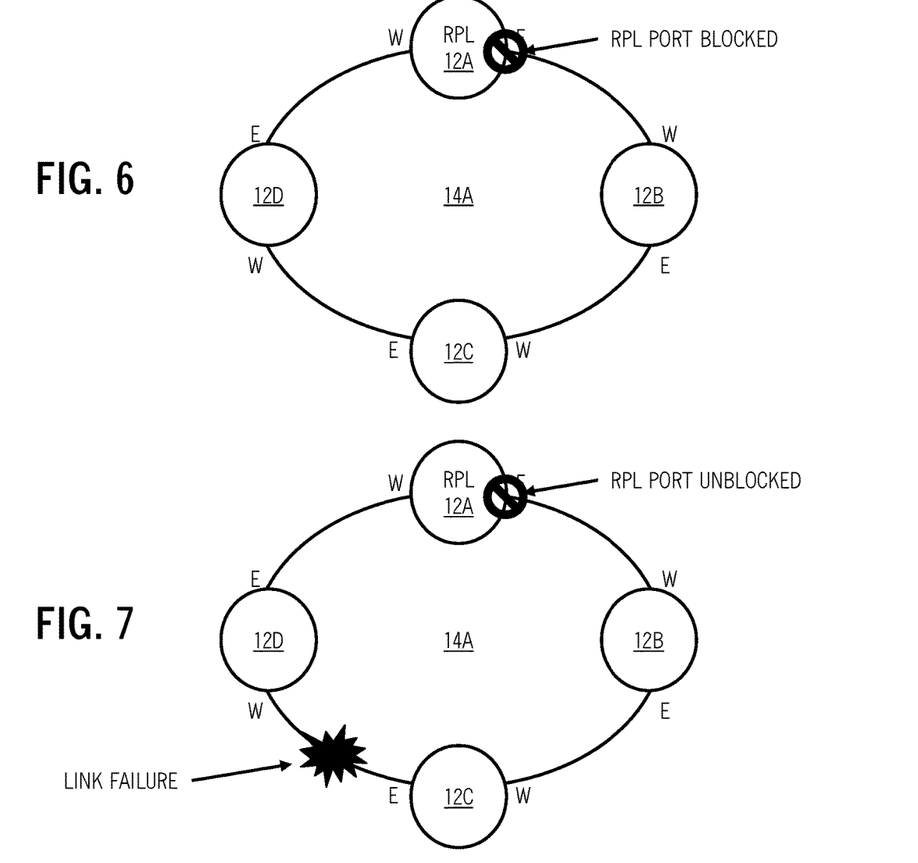
FIG. 6 is a network diagram of another ring with four nodes using G.8032 Ethernet Ring Protection with the ring in a normal operating condition.
FIG. 7 is a network diagram of the ring of FIG. 6 illustrating a link failure between two nodes.
Figure 8:
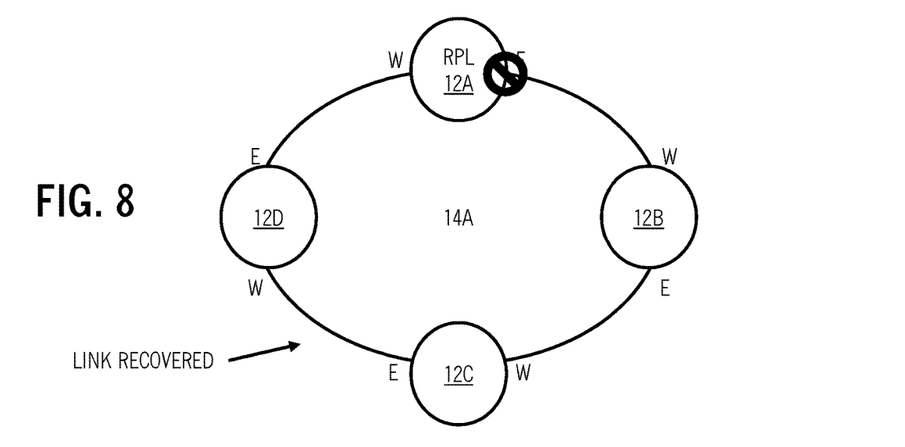
FIG. 8 is a network diagram of the ring of FIGS. 6 and 7 illustrating a link recovery of the link failure between the two nodes.

Referring to FIGS. 6, 7, and 8, in an exemplary embodiment, network diagrams illustrate a ring 14A with four nodes 12A, 12B, 12C, 12D using G.8032 Ethernet Ring Protection for illustrating G.8032 misconfiguration. In this example, the node 12A is the RPL owner with an RPL port block on its East port. FIG. 6 illustrates the ring 14A in a normal operating condition, FIG. 7 illustrates a link failure between the nodes 12C, 12D, and FIG. 8 illustrates a link recovery on the link failure between the nodes 12C, 12D. Again, in the ring 14A, where G8032 is used for loop avoidance and protection switching, if there are some misconfigurations related to protected VLANs, this may lead to broadcast storm in the ring 14A and is very hard to troubleshoot the misconfiguration in large G.8032 field deployments. Since most of Ethernet network nodes 12 are managed via a remote management WAN (in-band), during a broadcast storm management connectivity of all the nodes 45 will be lost, and the operator will not be able to log in remotely for troubleshooting.

Assume there are 100 VLANs configured on the ring 14A, denoted herein as VLANs 200 through 300. For an illustration of a G.8032 misconfiguration, assume the protected VLANs 200-300 are configured on all of the nodes 12, but that the node 12C has a misconfiguration. The G.8032 misconfigurations can be of two types—(1) the VLAN was initially not mapped as a protected VLAN on one or more nodes, and (2) the VLAN was removed from a protected VLAN list from one or more nodes.

In FIG. 6, while provisioning the VLANs 200-300 as protected VLANs in the ring 14A, the network operator missed mapping VLAN 250 to the ring 14A on the node 12C. Thus, the G.8032 misconfiguration in these examples is the lack of VLAN 250 provisioned at the node 12C on the ring 14A. In FIG. 6, in the normal operating condition, the RPL port is blocked on the node 12A. Despite the G.8032 misconfiguration, the ring 14A operates properly in the normal operating condition since the VLAN 250 is properly configured at the node 12A and the RPL block performs blocking on all of the VLANs 200-300.

In FIG. 7, there is a link failure between the nodes 12C, 12D, e.g., a fiber cut, a transceiver failure, etc. The nodes 12C, 12D detect as local Signal Failure condition and block these failed ring ports, there is signaling to the neighbor nodes 12A, 12B, and the node 12A unblocks the RPL port. Now, the RPL block is on the East port of the node 12C and the West port of the node 12D. Again, despite the G.8032 misconfiguration, the ring 14A operates properly here as the misconfigured VLAN 250 is still blocked due to the link failure.

In FIG. 8, when the link failure is restored, i.e., the link recovers, the nodes 12C, 12D detect a clearing of the Signal Fail condition. When a guard time expires on the nodes 12C, 12D, the nodes 12C, 12D accept new R-APS messages received. For example, the node 121) receives an R-APS (NR) message with a higher Node ID from the node 12C and unblocks its non-failed ring port, i.e., the West port on the node 12D. Now, the East port of node 12C is blocked and claims to block all the protected VLANs, but due to the G.8032 misconfiguration, VLAN 250 is missing at the node 12C in the protected VLANs. Thus, there will be broadcast storm on the VLAN 250, until WTR expiry (in the case of a revertive ring) which is not blocked on the node 12C. Also, if the ring 14A is configured as non-revertive, then this broadcast storm will persist until the node 12C causing the broadcast storm is identified, which again is difficult.

G.8032 Misconfiguration Detection Process

Figure 9:
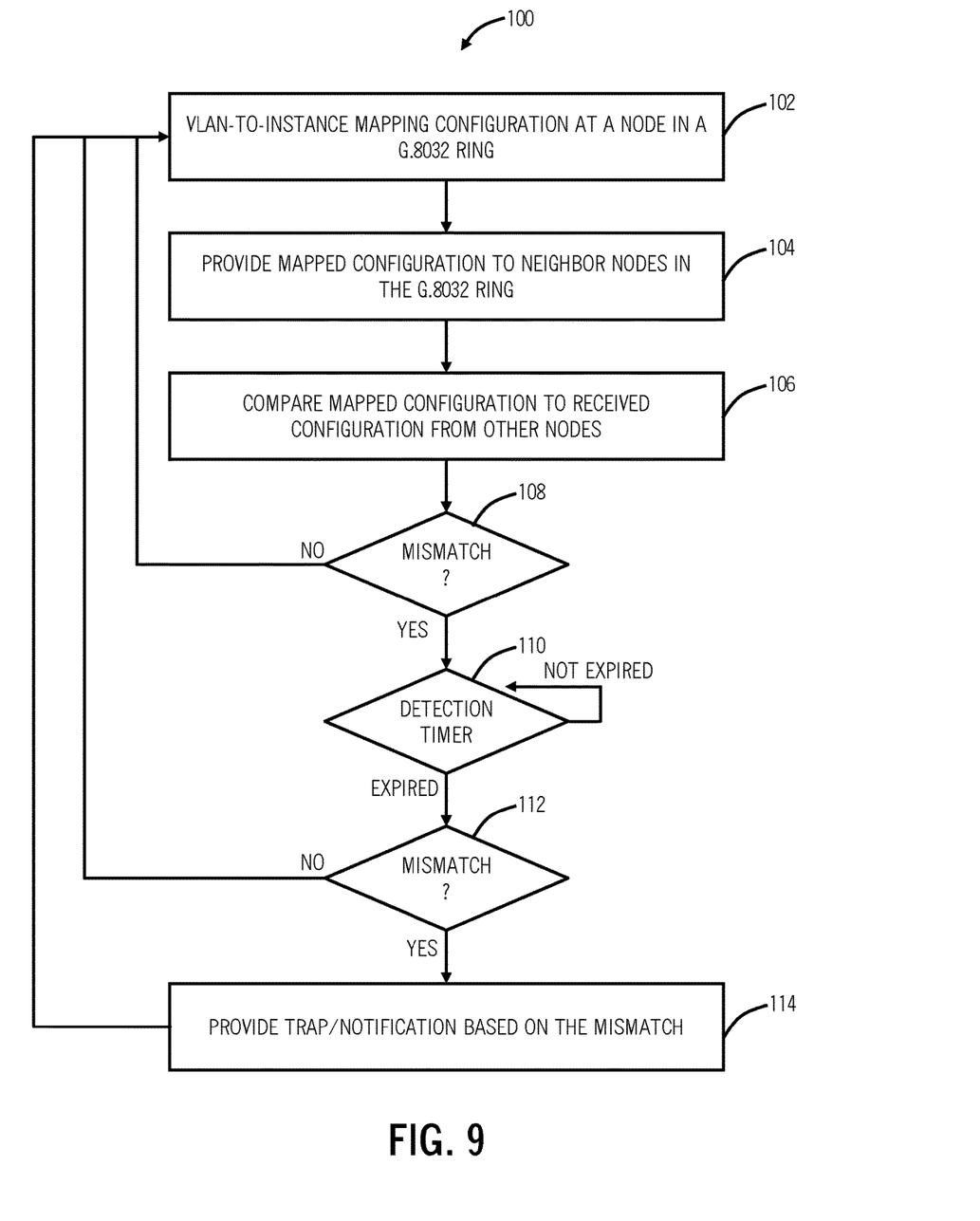
FIG. 9 is a flowchart of a G.8032 misconfiguration process to automatically identify and alert G.8032 misconfigurations.

Referring to FIG. 9, in an exemplary embodiment, a flowchart illustrates a G.8032 misconfiguration process 100 to automatically identify and alert G.8032 misconfigurations. The G.8032 misconfiguration process 100 is performed by and between the nodes 12 in the ring 14. In another exemplary embodiment, the G.8032 misconfiguration process 100 can be performed by the nodes 12 communicating with a management system. The objective of the G.8032 misconfiguration process 100 is to notify a network operator in advance via a trap or notification about any existing misconfigurations in the G.8032 ring 14.

The G.8032 misconfiguration process 100 includes VLAN-to-instance mapping at a node 12 in a G.8032 ring 14 (step 102). Here, each node 12 maps its configured VLANs to a G.8032 instance. This provides a mapped configuration for each node. In the examples of FIGS. 6, 7, and 8, the nodes 12A, 12B, 12D would map VLANs 200-300 to the ring 14A while the node 12C would map VLANs 200-249, 251-300 to the ring 14A.

The G.8032 misconfiguration process 100 includes providing the mapped configuration to neighbor nodes 12 in the G.8032 ring 14 (step 104). Here, the mapped configuration for each node 12 are shared with neighbor nodes 12 enabling comparisons and efficient detection of misconfigurations. In an exemplary embodiment, the mapped configuration is provided as a configuration digest number (config-digest) which can be sent in an R-APS Protocol Data Unit (PDU) as an organizationally specific-Type, Length, Value (TLV) therein. The config-digest can be 16-byte information of VI-AN-to-Instance mapping calculated by a Hash-based Message Authentication Code (HMAC)-MD5 sum algorithm, as used in the Multiple Spanning Tree Protocol (MSTP) to identify different MSTP regions based upon the VLAN-to-Instance mapping. With 16-bytes, the config-digest can provide the mapped configuration for up to 4096 VLANs and G.8032 instances.

The G.8032 misconfiguration process 100 includes receiving the mapped configuration and comparing the received configurations from neighbor nodes (step 106). Each node receiving this contig-digest info compares this with its own calculated config-digest info. The node 12 can extract the digest (a numerical value derived from the VLAN-to-instance mapping table through a mathematical function) and compares this digest with its own computed digest. If the digests differ, there is a G.8032 misconfiguration which can be determined based on the comparison. Note, the G.8032 misconfiguration process 100 can be performed periodically, on demand, or continuously. That is, the nodes 12 can periodically, on-demand, or continuously perform the mappings and provide to neighbor nodes 12.

If there is no mismatch (step 108), the G.8032 misconfiguration process 100 can end and return to step 102 for a next iteration. If there is a mismatch (step 108), a trap or notification should be raised so that an operator can look at the node 12 with the misconfiguration for corrective actions to avoid any loops in the future. Also, the operator can see locally calculated configuration digest such as via a management system, a Command Line Interface (CLI), etc. Thus, the operator can identify the misconfiguration by comparing the contig-digest of each node 12.

However, the G.8032 misconfiguration process 100 can provide a timer to ensure any G.8032 misconfiguration is persistent and not transitory during configuration. Thus, when a first mismatch is determined (step 108) such as by comparing mismatch config-digest between two nodes 12, a detection timer is initialized (step 110) so that any trap or notification is generated only after expiration of the detection timer.

Here, the G.8032 misconfiguration process 100 assumes the mapped configuration is provided periodically or continuously. If the config-digest info received matches with locally calculated contig-digest before the expiry of the detection timer, then this detection timer can be stopped, and no trap/notification sent, i.e., any G.8032 misconfiguration was transient. This avoids flooding of traps or notifications during an initial configuration of protected VLANs in a G.8032 instance, as the operator will be configuring nodes 12 one by one in the ring 14. In an exemplary embodiment, the default detection tinier can be set as 15 minutes with user configurable options. The periodic or continuous operation of the G.8032 misconfiguration process 100 can be on the same time intervals. The network operator can choose the detection timer depending upon a number of nodes 12 in the ring 14, as the larger the ring 14 requires more time to provision each node 12.

After the expiration of the detection timer (step 110), if there is still a mismatch (step 112), the G.8032 misconfiguration process 100 can provide a trap or notification based on the mismatch. The trap or notification can be via a management system, Network Management System (NMS), Element Management System (EMS), Craft Interface, CLI, etc. Through the trap or notification, the network operator is aware that the existing G.8032 misconfigurations may lead to broadcast storms and may take the whole network down. The network operator can take preventive actions in advance to avoid network disaster, namely correcting any G.8032 misconfigurations.

Figure 10:
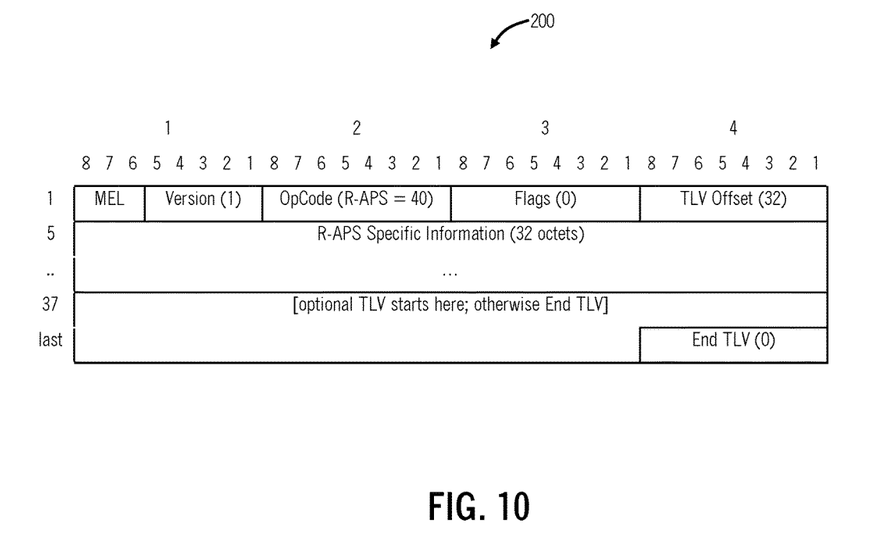
FIG. 10 is a logical diagram of a Ring Automated Protection Switching (R-APS) Protocol Data Unit (PDU) which can be used to communicate the mapped configuration between the nodes.

Referring to FIG. 10, in an exemplary embodiment, a logical diagram illustrates an R-APS PDU 200 which can be used to communicate the mapped configuration between the nodes 12. Conventionally, the R-APS 200 carries R-APS information and is one of a suite of Ethernet Operations, Administration, and Maintenance (OAM) messages. The OAM PDU format for each type of Ethernet OAM operation is defined in ITU-T G.8013 "Operations, administration and maintenance (OAM) functions and mechanisms for Ethernet-based networks," (August 2015), the contents of which are incorporated by reference herein. R-APS specific information is transmitted within specific fields in the R-APS PDU 200. The R-APS PDU 300 is identified by the Ethernet OAM OpCode 40.

The MEL field represents the Maintenance Entity Group Level. The Version is fixed based on the protocol version used. The OpCode is 40 designating the R-APS PDU 200 for R-APS. The Flags are ignored, the TLV offset determines where the TLVs begin (32 octets in this case), and the End TLV is a delimiter marking the last TLV. R-APS Specific Information includes 32 octets in the R-APS PDU 200. The R-APS Specific Information includes a request/state (e.g., forced switch, event, Signal Fail, Manual Switch, No Request, and reserved values for the future), a sub-code (e.g., flush request, and reserved values for the future), a status (e.g., RPL blocked, Do Not Flush, Blocked port reference, and reserved values for the future), a node ID uniquely identifying the node 12, and reserved values for the future. That is, the R-APS Specific Information provides information required for the nodes 12 to perform G.8032 Ethernet Ring Protection between one another.

The mapped configuration, e.g., the config-digest, may be communicated as TLVs, specifically IEEE organizationally specific TLVs. The organizationally specific TLVs can be defined by specific vendors, without requiring standardization. The organizationally specific TLVs includes an Organizationally Unique Identifier (OUT) which is a unique number assigned by the IEEE to an organization or vendor and an OUT sub-type. In the G.8032 misconfiguration process 100, the config-digest of a local node 12 can be inserted as one of the organizationally specific TLVs in the R-APS PDU 200. The R-APS PDU 200 is received by neighbor nodes 12 on the G.8032 ring 14 which can extract this config-digest and perform the G.8032 misconfiguration process 100.

Exemplary Network Element

Figure 11:
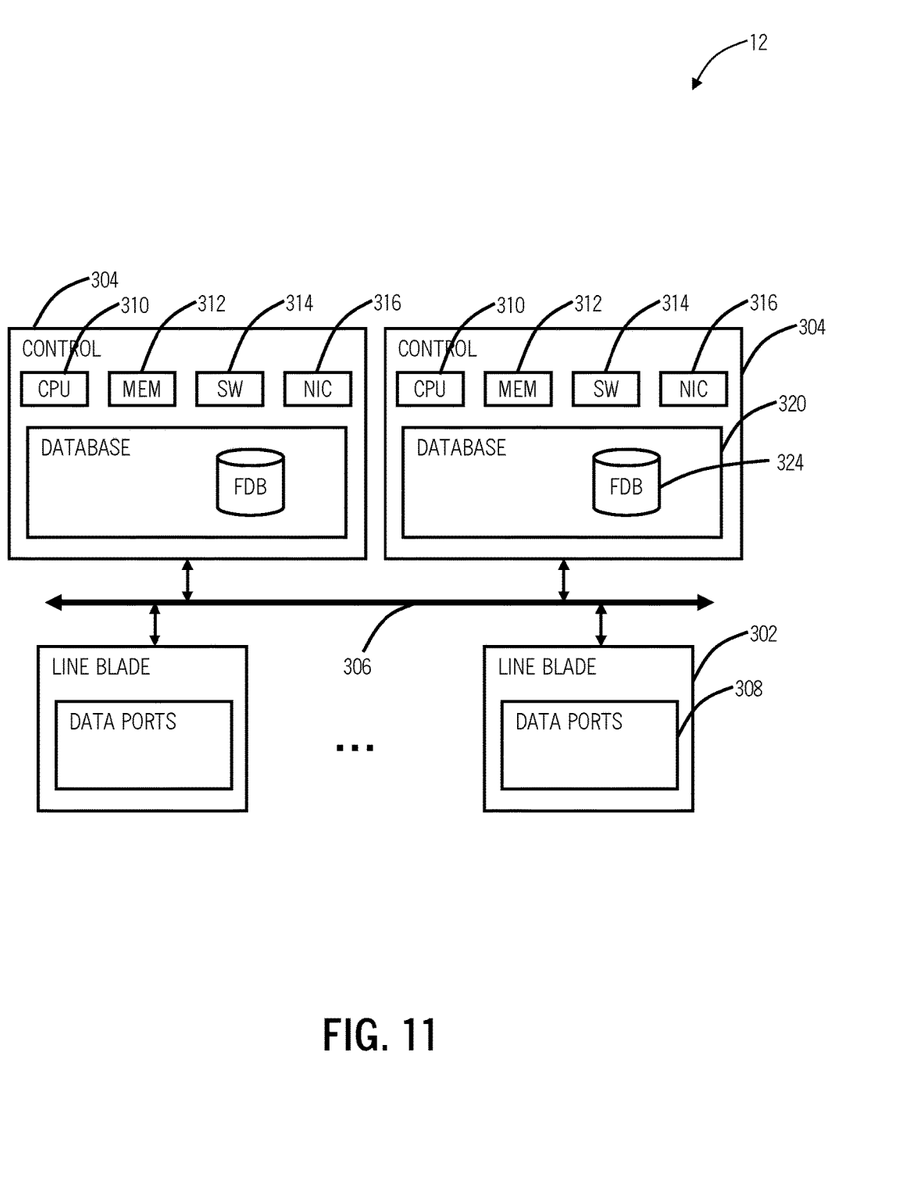
FIG. 11 is a block diagram of an exemplary implementation of the node.

Referring to FIG. 11, in an exemplary embodiment, a block diagram illustrates an exemplary implementation of the node 12. In this exemplary embodiment, the node 12 is an Ethernet network switch, but those of ordinary skill in the art will recognize other types of network elements and other implementations are contemplated, such as, for example, a layer two switch integrated within an optical network element. In this exemplary embodiment, the node 12 includes a plurality of blades 302, 304 interconnected via an interface 306. The blades 302, 304 are also known as line cards, line modules, circuit packs, pluggable modules, etc. and generally refer to components mounted within a chassis, shelf, etc. of a data switching device, i.e. the node 12. In another exemplary embodiment, the functionality of each of the blades 302, 304 may be integrated into a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 102 out by the correct port 308 to the next network element. The switching fabric includes switching units, or individual boxes, in a node; integrated circuits contained in the switching units; and programming that allows switching paths to be controlled.

The control blades 304 include a microprocessor 310, memory 312, software 314, and a network interface 316 to operate within the rings 14. Specifically, the microprocessor 310, the memory 312, and the software 314 may collectively control, configure, provision, monitor, etc. the node 12. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the node 12 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the node 12. In an exemplary embodiment, the blades 302, 304 are configured to implement G.8032 rings, such as the major ring and/or sub-rings, and to implement the various processes, algorithms, methods, mechanisms, etc. described herein for implementing the G.8032 misconfiguration process 100.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A G.8032 misconfiguration detection method in a node, comprising:
  in the node that includes a plurality of ports and a switching fabric, receiving a mapped configuration from another node on a G.8032 ring via one of the plurality of ports, wherein the mapped configuration comprises a mapping of Virtual Local Area Network (VLAN) identifiers to G.8032 instances configured at the another node;

comparing the mapped configuration with a local configuration on the node; and responsive to a mismatch in the comparing, providing one of a trap and a notification based on the mismatch.

2. The G.8032 misconfiguration detection method of claim 1, further comprising:

responsive to the mismatch, implementing a detection timer and providing one of the trap and the notification only if the mismatch is present subsequent to expiration of the detection time.

3. The G.8032 misconfiguration detection method of claim 1, wherein the mapped configuration is received in a Ring Automated Protection Switching (R-APS) Protocol Data Unit (PDU).

4. The G.8032 misconfiguration detection method of claim 1, wherein the mapped configuration is received in a Ring Automated Protection Switching (R-APS) Protocol Data Unit (PDU), as an Organizationally Specific Type, Length, and Value (TLV).

5. The G.8032 misconfiguration detection method of claim 1, wherein the mapped configuration is provided as a configuration digest comprising a representation of the VLAN identifiers to G.8032 instances in an N byte format.

6. The G.8032 misconfiguration detection method of claim 1, wherein the mapped configuration is provided as a configuration digest comprising a representation of the VLAN identifiers to G.8032 instances in an N byte format, and wherein the comparing comprises a function to compare the representation from the received mapped configuration to the representation of the local configuration.

7. The G.8032 misconfiguration detection method of claim 1, wherein the G.8032 rings has at least 100 VLANs configured thereon.

8. The G.8032 misconfiguration detection method of claim 1, wherein the G.8032 misconfiguration comprises one of a VLAN not mapped as protected to a node and a VLAN removed from a protected list at the node.

9. A node adapted to perform G.8032 misconfiguration detection, comprising:

one or more ports with a switching fabric interconnecting each port; and a controller communicatively coupled to the one or more ports and configured to obtain a mapped configuration from another node on a G.8032 ring, wherein the mapped configuration comprises a mapping of G.8032 instances to Virtual Local Area Network (VLAN) identifiers configured at the another node, compare the mapped configuration with a local configuration on the node, and raise one of a trap and a notification based on detection of a mismatch.

10. The node of claim 9, wherein the controller is further configured to responsive to the mismatch, implement a detection timer and provide one of the trap and the notification only if the mismatch is present subsequent to expiration of the detection time.

11. The node of claim 9, wherein the mapped configuration is received in a Ring Automated Protection Switching (R-APS) Protocol Data Unit (PDU).

12. The node of claim 9, wherein the mapped configuration is provided as a configuration digest comprising a representation of the VLAN identifiers to G.8032 instances in an N byte format.

13. The node of claim 9, wherein the G.8032 rings has at least 100 VLANs configured thereon.

14. The node of claim 9, wherein the G.8032 misconfiguration comprises one of a VLAN not mapped as protected to a node and a VLAN removed from a protected list at the node.

15. A G.8032 misconfiguration detection apparatus, comprising:

in node that includes a plurality of ports and a switching fabric, circuitry configured to receive a mapped configuration from another node on a G.8032 ring via one of the plurality of ports, wherein the mapped configuration comprises a mapping of G.8032 instances to Virtual Local Area Network (VLAN) identifiers configured at the another node;

circuitry configured to compare the mapped configuration with a local configuration on the node; and circuitry configured to provide one of a trap and a notification based on detection of a mismatch.

16. The G.8032 misconfiguration detection apparatus of claim 15, further comprising:

circuitry configured to implement a detection timer responsive to the mismatch and provide one of the trap and the notification only if the mismatch is present subsequent to expiration of the detection time.

17. The G.8032 misconfiguration detection apparatus of claim 15, wherein the mapped configuration is received in a Ring Automated Protection Switching (R-APS) Protocol Data Unit (PIU).

18. The G.8032 misconfiguration detection apparatus of claim 15, wherein the mapped configuration is provided as a configuration digest comprising a representation of the VLAN identifiers to G.8032 instances in an N byte format.

19. The G.8032 misconfiguration detection apparatus of claim 15, wherein the G.8032 rings has at least 100 VLANs configured thereon.

20. The G.8032 misconfiguration detection apparatus of claim 15, wherein the G.8032 misconfiguration comprises one of a VLAN not mapped as protected to a node and a VLAN removed from a protected list at the node.

* * * * *